United States Patent [19]

Lakey

[11] Patent Number: 4,743,830
[45] Date of Patent: May 10, 1988

[54] DUAL VOLTAGE ELECTRICAL SYSTEM

[75] Inventor: Leroy E. Lakey, Anderson, Ind.

[73] Assignee: General Motors Corporation, Detroit, Mich.

[21] Appl. No.: 4,486

[22] Filed: Jan. 20, 1987

[51] Int. Cl.$^4$ .............................................. H02J 7/14
[52] U.S. Cl. ............................................ 320/6; 320/17; 320/35; 322/90
[58] Field of Search ............................ 320/3, 6, 15–18, 320/35, 36, 21; 322/90

[56] References Cited

U.S. PATENT DOCUMENTS

| | | | |
|---|---|---|---|
| 3,667,025 | 5/1972 | Campbell et al. | 320/15 |
| 3,671,843 | 6/1972 | Huntzinger et al. | 320/15 |
| 4,047,088 | 9/1977 | Himmler | 320/6 |
| 4,179,647 | 12/1979 | Cummins et al. | 320/6 |
| 4,236,107 | 11/1980 | Templin | 320/21 |
| 4,281,277 | 7/1981 | Lakey | 320/6 |
| 4,479,083 | 10/1984 | Sullivan | 320/6 |
| 4,492,912 | 1/1985 | Nowakowski | 320/6 |

Primary Examiner—R. J. Hickey
Attorney, Agent, or Firm—C. R. Meland

[57] ABSTRACT

A dual voltage motor vehicle electrical system. First and second batteries are series connected across the output terminals of a battery charging generator. A converter is provided that can charge the first battery from the second battery or charge the second battery from the first battery. The voltages across the batteries are sensed and the battery with the lower voltage is charged from the other battery. The system has current limit and temperature limit controls for protecting semiconductor switches that are utilized in the system.

7 Claims, 2 Drawing Sheets

DUAL VOLTAGE ELECTRICAL SYSTEM

This invention relates to a dual voltage electrical system and more particularly to a dual voltage motor vehicle electrical system.

Dual voltage motor vehicle electrical systems are well known, one example being the system disclosed in the Campbell et al U.S. Pat. No. 3,667,025 granted on May 30, 1972. In that patent a pair of 12 volt batteries are connected in series across the output terminals of a 24 volt battery charging system. A DC to DC converter is provided that has an input connected to one of the batteries and output connected to the other battery. The system tends to maintain the voltages across the batteries substantially equal and therefore can be said to operate as a battery voltage equalizer. The system of the Campbell et al patent can transfer energy from only one battery to another battery. It, thus, does not provide for bidirectional tansfer of energy between the batteries.

In contrast to systems of the type disclosed in the above referenced Campbell et al patent, it is an object of this invention to provide a dual voltage system that provides bidirectional transfer of energy between the batteries. The electrical system of this invention senses the voltage across first and second batteries. If the voltage across the first battery is lower than the voltage across the second battery, the system operates to charge the first battery from the second battery. If the voltage across the second battery is lower than the voltage across the first battery, the system switches to a mode of operation in which the second battery is charged from the first battery.

Another object of this invention is to provide a dual voltage electrical system that can charge one battery from the other battery and vice-versa that has a converter that comprises an inductor or choke coil, a pair of switching devices and a pair of diodes. When one battery is to be charged from the other battery, the one battery is connected to the inductor coil by one of the switching devices and accordingly the one battery supplies current to the inductor. When the switching device goes nonconductive, the voltage reverses across the inductor and the inductor now supplies charging current to the other battery through one of the diodes.

Another object of this invention is to provide a dual voltage electrical system that has a converter that includes an inductor and at least one diode and at least one semiconductor switching device that is provided with current limit and temperature limit controls to protect the semiconductor switching device from excessive temperature or current.

In the drawings

Figure 1:
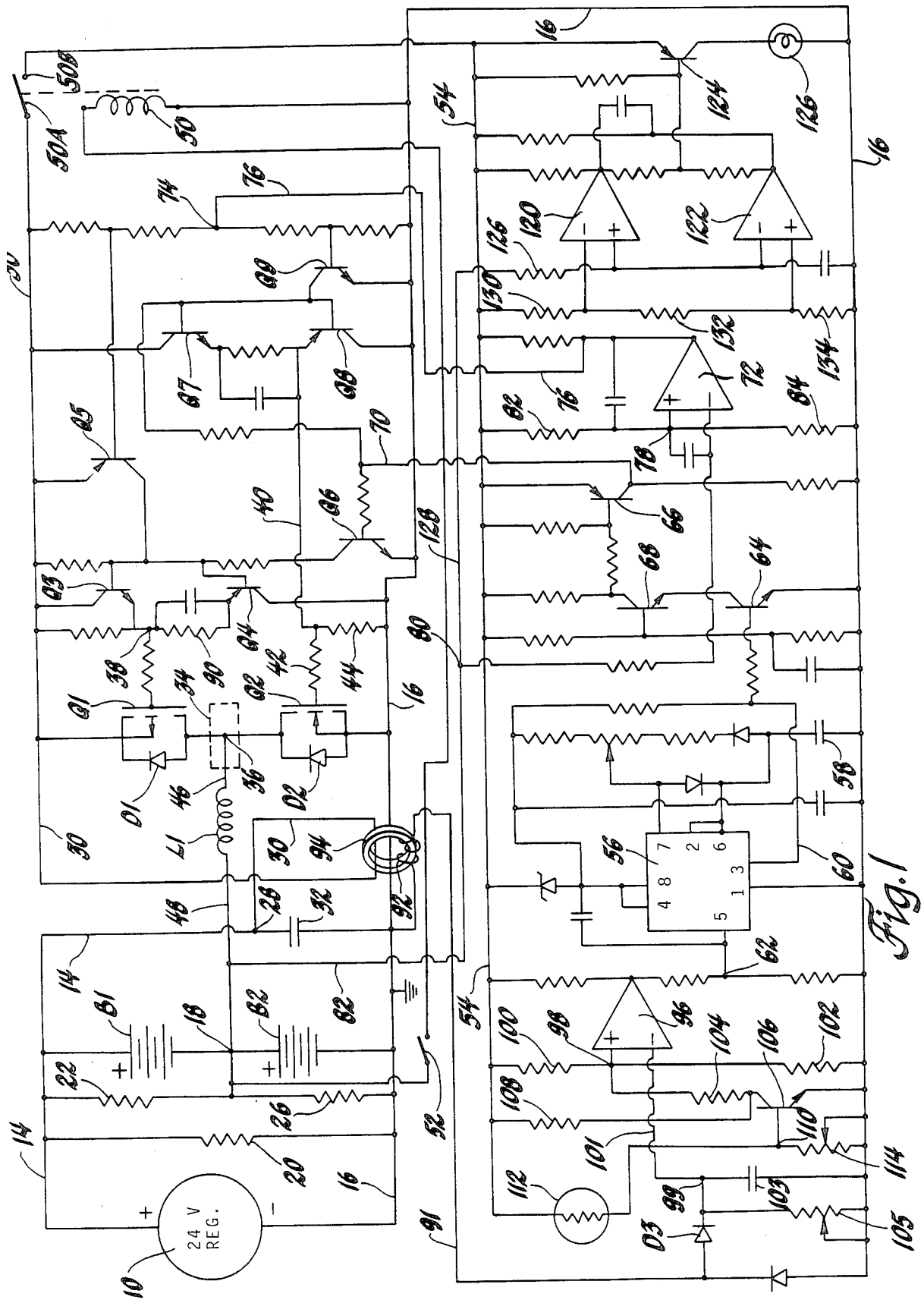
FIG. 1 is a schematic circuit diagram of a dual voltage motor vehicle electrical system that includes means for providing bidirectional transfer of current between a pair of batteries.

Referring now to FIG. 1, the reference numeral 10 designates a voltage regulated 24 volt diode-rectified alternating current generator that has a three-phase stator winding and a field winding. The stator winding is connected to a three-phase full-wave bridge rectifier having direct-voltage output terminals connected to power supply conductors 14 and 16. The field winding is connected to a voltage regulator which senses the voltage across conductors 14 and 16 and controls field current to maintain the voltage across these conductors at a desired regulated value of, for example, 28 volts. The field winding of the generator is carried by the rotor of the generator and the rotor is driven by the engine of a motor vehicle in a known manner. The stator winding, bridge rectifier, field winding and voltage regulator have not been illustrated since they are conventional. An example of a voltage regulated diode—rectified alternating current generator is disclosed in the Cheetham et al U.S. Pat. No. 3,538,362.

In the further description of this invention, it will be assumed that the system is a 12–24 volt system so that the direct voltage developed by diode-rectified alternating current generator 10 will be, for example, 28 volts.

The electrical system of this invention has two 12 volt storage batteries designated respectively as B1 and B2. These batteries are connected in series across conductors 14 and 16 with the positive terminal of battery B2 connected to the negative terminal of battery B1. The negative terminal of battery B1 and the positive terminal of battery B2 are connected to a junction or node 18. The batteries B1 and B2 can be in separate cases or can be provided in a single battery case that would have three terminals.

Connected across conductors 14 and 16 is a 24 volt electrical load designated by reference numeral 20. The system has two 12 volt electrical loads designated respectively by reference numerals 22 and 26.

The conductor 14 is connected to a junction 28 which, in turn, is connected to a conductor 30. A capacitor 32 is connected between junction 28 and conductor 16.

The system of FIG. 1 has a converter which is capable of causing battery B1 to charge battery B2 or vice-versa depending upon load unbalance as will be more fully described hereafter. This converter comprises field effect transistors Q1 and Q2 and an inductor or choke coil L1. The inductance of coil L1 may be about 160 microhenries. The transistor Q1 is a P-channel enhancement mode field effect transistor for example an RCA type RFK25P10 transistor. This transistor has a built in diode D1.

The transistor Q2 is an N-channel enhancement mode field effect transistor, for example a Siemens type BUZ 36 transistor. Transistor Q2 has a built-in diode D2. Both transistors Q1 and Q2 are mounted on an insulated metallic heat sink 34.

The source electrode of transistor Q1 is connected to conductor 30 and its drain electrode is connected to junction 36. The gate electrode of transistor Q1 is connected to junction 38 by a resistor.

The drain electrode of transistor Q2 is connected to junction 36 and the source electrode of this transistor is connected to conductor 16. The gate electrode of transistor Q2 is connected to conductor 40 via resistor 42 and to conductor 16 via resistors 42 and 44.

The inductor or choke coil L1 is connected between junctions 36 and 18 by conductors 46 and 48.

Before proceeding to a further description of this invention the operation of the converter to charge one battery from the other will be generally described. Assume that it is desired to charge battery B1 from battery B2. When this mode of operation is called for, the transistor Q2 is biased sequentially conductive and nonconductive and transistor Q1 is biased continuously nonconductive. When transistor Q2 is biased conductive, a current path is established which can be traced from the positive side of battery B2, through conductor 48, through inductor L1, through conductor 46 to junction 36, through conducting transistor Q2 to conductor 16 and then to the negative side of battery B2. Current is now supplied to inductor L1. When transistor Q2 is subsequently biased nonconductive, the voltage across inductor L1 reverses polarity and the inductor L1 now supplies charging current to battery B1 via a current path that can be traced from conductor 46 to junction 36, through diode D1, through conductor 30 to junction 28, through conductor 14 to the positive side of battery B1, through battery B1 to junction 18 and then through conductor 48 to one side of inductor L1. The magnitude of the voltage developed by inductor L1 is slightly higher than the terminal voltage of battery B1 and accordingly battery B1 is supplied with charging current when transistor Q2 goes nonconductive.

Assume now that the system calls for a mode of operation in which battery B2 is charged from battery B1. In this mode of operation transistor Q1 is sequentially biased conductive and nonconductive and transistor Q2 is continuously biased nonconductive. When transistor Q1 is conductive, battery B1 supplies current to conductor L1. When transistor Q1 goes nonconductive, the voltage across inductor L1 reverses polarity and inductor L1 now supplies charging current to battery B2 through a circuit that includes conductor 16 and diode D2.

When a transistor, for example transistor Q1, is conductive the current through inductor L1 increases along a ramp curve due to the inductance of coil L1. When transistor Q1 goes nonconductive, the current the inductance of coil L1. The coil current therefore ramps up and down to provide an average DC coil current.

The system of FIG. 1 has a relay comprised of relay coil 50, movable relay contactor 50A and fixed relay contact 50B. Relay coil 50 is controlled by ignition switch 52 and when switch 52 is closed, coil 50 is energized to cause contractor 50A to engage contact 50B. When this happens, conductor 14 is connected to conductor 54.

The system of FIG. 1 has frequency generator or square wave oscillator that comprises a National Semiconductor LM-555 integrated circuit 56. The terminals of this integrated circuit are shown in FIG. 1. This integrated circuit in conjunction with the electric circuit elements connected thereto including capacitor 58 operates as a square wave oscillator or a stable multivibrator. The output of circuit 56 is taken from terminal 3 which is applied to conductor 60. Circuit 56 has a control terminal 5 which is connected to junction 62.

The square wave voltage applied to conductor 60 is applied to the base of an NPN transistor 64. Transistor 64 switches on and off and it is connected to PNP transistor 66 via transistor 68. Transistor 66 switches on and off in accordance with the square wave output voltage applied to conductor 60.

The collector of transistor 66 is connected to a conductor 70. When transistor 66 is biased conductive, the voltage applied to conductor 70 goes high or to substantially the voltage on conductor 54. When transistor 66 is biased nonconductive, no voltage is applied to conductor 70. The voltage on conductor 70 follows the square wave output voltage of circuit 56.

The square wave voltage on conductor 70 is applied to the base of an NPN transistor Q6, to the base of NPN transistor Q7 and to the base of PNP transistor Q8. A high voltage on conductor 70 tends to bias transistors Q6 and Q7 conductive and transistor Q8 nonconductive. With no voltage on conductor 70, transistors Q6 and Q7 are biased nonconductive.

The system of FIG. 1 has a voltage comparator 72 the output of which is connected to junction 74 by conductor 76. The input terminals of comparator 72 are respectively connected to junctions 78 and 80. The junction 78 is connected to voltage divider resistors 82 and 84 which have equal resistance values of, for example, 49.9K ohms. The voltage at junction 78 is therefore one-half the voltage appearing between conductors 14 and 16 since conductor 54 is connected to conductor 14. Thus, if the voltage between conductors 14 and 16 is 28 volts, the voltage at junction 78 would be 14 volts.

The voltage at junction 80 is the same as voltage at junction 18 between batteries B1 and B2 since junction 80 is connected to junction 18 via conductor 82.

From the foregoing, it will be apparent that the voltage comparator 72 compares one-half of the voltage between conductors 14 and 16 with the voltage at junction 18. If the voltage across batteries B1 and B2 are equal (balanced load) the voltages at junctions 78 and 80 will be substantially equal. If the voltage across batteries B1 and B2 are not equal (unbalanced load) the voltages of junctions 78 and 80 will not be equal and the difference in these voltages is applied to voltage comparator 72.

Let it be assumed that the voltage across battery B1 is less than the voltage across battery B2 (unbalanced load). When the condition occurs, the output of comparator 72 goes low which causes the voltage at junction 74 to go low. The junction 74 is connected via resistors to the base of PNP transistor Q5 and to the base of NPN transistor Q9. Thus, with a low voltage on junction 74 transistor Q5 is biased conductive and transistor Q9 is biased nonconductive. The collector of transistor Q5 is connected to the base of NPN transistor Q3 and since Q5 is conductive transistor Q3 is biased conductive. The collector of transistor Q3 is connected to conductor 30 and its emitter is connected to the gate of transistor Q1. Since transistor Q3 is conducting a voltage is applied to the gate of transistor Q1 to bias it nonconductive. Keeping in mind that transistor Q9 is nonconductive, the square wave voltage on conductor 70 will cause transistors Q6 and Q7 to switch on and off. When a high voltage is developed on conductor 70, both transistors Q6 and Q7 are biased conductive. The conduction of transistor Q6 does not cause transistor Q4 to conduct because it is biased off by conducting transistor Q5. The collector of transistor Q7 is connected to conductor 30 and its emitter is connected to the gate of transistor Q2 via line 40 and resistor 42. Therefore, with transistor Q7 conductive a positive voltage is applied to the gate of transistor Q2 causing it to be biased conductive. With Q2 conducting battery B2 supplies current to inductor L1.

When transistor 66 switches off so that no voltage is applied to conductor 70 transistors Q6 and Q7 are biased nonconductive. With transistor Q7 off there no longer is a forward bias applied to transistor Q2 and it accordingly goes nonconductive. Inductor L1 now supplies current to battery B1 via diode D1. Transistor Q2 switches on and off at the switching frequency of circuit 56 as long as the voltage across battery B2 exceeds the voltage across battery B1.

Let it be assumed now that the voltage across battery B2 is less than the voltage across battery B1 (unbalanced load). During this condition of operation battery B1 will charge battery B2 and the system operates such that transistor Q1 switches on and off and transistor Q2 is continuously nonconductive. If the voltage across battery B2 is less than the voltage across battery B1, the output of comparator 72 goes high so that a high voltage is applied to junction 74. With a high voltage on junction 74 transistor Q5 is biased off and transistor Q9 is biased on. With transistor Q9 biased on transistor Q8 is biased on. The emitter-collector circuit of transistor Q8 now connects the gate of transistor Q2 to conductor 16. This biases transistor Q2 nonconductive. As the voltage on conductor 70 goes between a high level and no voltage (switching of transistor 66) transistor Q1 will be switched on and off. When the voltage on conductor 70 goes high, transistor Q6 is biased on. This causes transistor Q4 to be biased conductive. Transistor Q4 now provides a current path between the gate of transistor Q1 and conductor 16 through resistor 90. This causes transistor Q1 to be biased conductive. When no voltage is applied to conductor 70, Q6 is biased off which biases Q4 off and Q1 accordingly is biased nonconductive. When Q1 is biased conductive current is supplied to inductor L1 from battery B1. When transistor Q1 is biased nonconductive the inductor L1 supplies current to battery B2 via diode D2.

The output frequency of the square wave voltage generator 56 is constant and may be about 8000 Hz. Under normal conditions the duty cycle may be about 50%, that is a transistor like transistor Q1 is biased conductive for 50% of a given cycle. As will be explained, the system will operate in a different manner if a current limit or temperature limit is reached.

It should be apparent that the 24 volt generator 10 charges the batteries B1 and B2 in series and that the converter that has been described operates to charge one battery from the other battery during unbalanced load conditions.

The system of FIG. 1 includes temperature limit and current limit controls which will now be described. The current limit circuit comprises a current transformer that has a coil 92 and a ferrite core 94. The conductors 16 and 30 pass through core 94 and the coil 92 is wound on the core. The voltage developed by coil 92 accordingly is a function of the magnitude of the current in conductors 16 and 30. The current transformer therefore operates as a current sensor which senses the magnitude of the current flowing in conductors 16 and 30.

The current sensor coil 92 is connected to the negative input terminal of a comparator 96 by conductor 91, diode D3, junction 99 and conductor 101. A capacitor 103 is connected between junction 99 and conductor 16. A variable resistor 105 is connected across capacitor 103. The output of comparator 96 is connected to input terminal 5 of square wave generator circuit 56. The positive input terminal of comparator 96 is connected to junction 98. The junction 98 is located between voltage divider resistors 100 and 102. A circuit comprised of resistor 104 and the collector-emitter circuit of transistor 106 is connected between junction 98 and conductor 16. The collector of transistor 106 is connected to line 54 by a resistor 108. The base of transistor 106 is connected to junction 110 located between a negative temperature coefficient of resistance thermistor 112 and variable resistor 114. The thermistor 112 is located in heat transfer relationship with heat sink 34 so that it responds to the temperature of heat sink 34 and accordingly to the temperature of transistors Q1 and Q2.

It will be appreciated that the current in conductors 16 and 30 will follow ramp curves as transistor Q1 or Q2 switch on and off. This current is smoothed by inductor L1 so that it does not go to a zero level. The capacitor 103 is charged from the coil 92 and the voltage to which capacitor 103 is charged is a function of the average current flowing in conductors 16 and 30.

The output of comparator 96, which is applied to terminal 5 of square-wave generator circuit 56, is high whenever the current in lines 16 or 30 is below a current limit value and is high when the temperature of transistors Q1 and Q2 is below a temperature limit. The square wave generator under this condition of operation causes the voltage on conductor 70 to vary in a manner that has been described. If either the current limit or temperature limit is exceeded, the output of comparator goes from high to low and this low input to terminal 5 of circuit 56 causes the square generator circuit 56 to cease oscillation. When circuit 56 ceases oscillation, there is no voltage developed on conductor 70 and accordingly transistors Q6 and Q7 are nonconductive. With transistors Q6 and Q7 nonconductive, transistors Q1 and Q2 cannot be biased conductive and these two transistors therefore remain nonconductive. This is true regardless of the voltage applied to junction 74 from comparator 72.

When the current in line 16 or 30 exceeds a current limit value the voltage across capacitor 103 attains a value that is sufficient to cause the output of comparator 96 to go from a high level to a low level. Once the current limit is exceeded transistors Q1 and Q2 are biased off and accordingly the current through conductors 16 and 30 temporarily goes to zero. Capacitor 103 now discharges through resistor 105 and when this voltage drops to a certain value the output of comparator 96 goes high thereby permitting transistors Q1 and Q2 to resume conduction. From the foregoing it will be appreciated that when the current in conductor 16 or 30 exceeds the current limit value neither transistor Q1 or Q2 is allowed to conduct and when the current in conductor 16 or 30 drops below the current limit value transistor Q1 or Q2 can conduct.

The temperature limit operation will now be described. If the temperature of heat sink 34 exceeds a predetermined value the resistance of thermistor 112 decreases to a point which causes transistor 106 to conduct. This lowers the voltage at junction 98 to such a value that the output of comparator 96 goes from a high value to a low value. This causes the square oscillator 56 to cease oscillation with the result that transistors Q1 and Q2 cannot conduct. Therefore transistors Q1 and Q2 cannot conduct as long as the temperature of heat sink 34 exceeds a temperature limit value. The temperature of heat sink 34 is of course a direct function of the temperature of transistors Q1 and Q2.

The system of FIG. 1 includes circuitry for indicating that the load is unbalanced, that is, the voltage across batteries B1 and B2 are not equal. This circuitry comprises comparators 120 and 122, the outputs of which are connected to the base of PNP transistor 124. The transistor 124 controls the energization of signal lamp 126. The positive terminal of comparator 120 and the negative terminal of comparator 122 are connected to junction 18 via resistor 126, conductor 128 and conductor 82. A voltage divider comprised of resistors 130, 132 and 134 is connected across conductors 54 and 16. The negative terminal of comparator 120 and the positive terminal of comparator 122 are connected to junctions of the voltage divider. Resistors 130 and 134 have equal resistance values. The circuitry that has been described causes the lamp 126 to be energized when the difference in voltages across batteries B1 and B2 exceeds a predetermined value to thereby indicate an unbalanced load.

The comparators 72, 96, 120 and 122 can be of the National Semiconductor type LM 139 which has four comparators in a single package.

Figure 2:
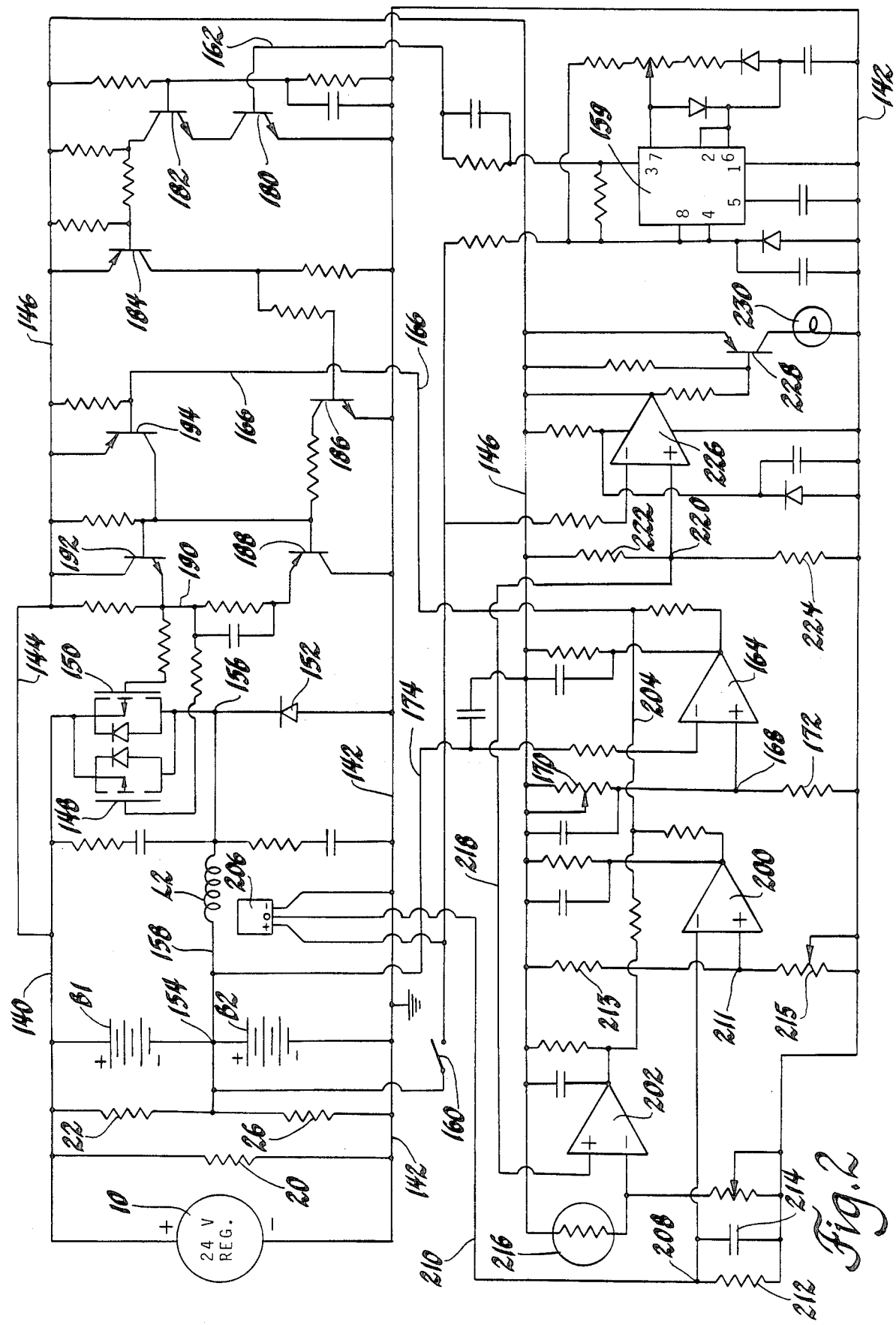
FIG. 2 is a schematic current diagram of a dual voltage motor vehicle electrical system that operates to charge only one of the batteries from the other.

Referring now to FIG. 2, a modified dual voltage motor vehicle electrical system is illustrated. In FIG. 2, the same reference numerals have been used as were used in FIG. 1 to identify corresponding circuit elements. The system of FIG. 2 is capable of charging battery B2 from battery B1 but cannot charge battery B1 from battery B2.

The 24 volt generator 10 in FIG. 2 is connected to conductors 140 and 142. Conductor 140 is connected to conductors 144 and 146.

The system of FIG. 2 has a converter comprised of parallel connected transistors 148 and 150, inductor L2 and diode 152. Transistors 148 and 150 are P-channel enhancement mode transistors, for example RCA RFK25P10 transistors. The inductor L2 may have an inductance of about 160 microhenries and it is connected between junctions 154 and 156. A conductor 158 connects inductor L2 and junction 154.

Before proceeding to a further description of FIG. 2, a description of the operation of the converter will be described when battery B1 charges battery B2. During this mode of operation transistors 148 and 150 are switched on and off under control of a square-wave generator. When transistors 148 and 150 conduct battery B1 supplies current to inductor L2. When transistors 148 and 150 are biased off the voltage across inductor L2 reverses and the inductor L2 now supplies current to battery B2 via conductor 158, conductor 142 and diode 152.

The system of FIG. 2 has a square-wave oscillator comprised of a National Semiconductor type LM555 integrated circuit 159. This circuit is energized when ignition switch 160 is closed. The square wave generator or oscillator develops a square wave voltage that is applied to conductor 162.

The system of FIG. 2 has a voltage comparator 164 the output of which is connected to conductor 166. The positive terminal of comparator 164 is connected to junction 168. The resistance values of variable resistor 170 and resistor 172 are equal so that the voltage at junction 168 is equal to one-half the voltage across conductors 140 and 142. The negative terminal of comparator 164 is connected to junction 154 via line 174. Comparator 164 responds to the difference in the voltage of junction 154 and one-half the voltage between conductors 140 and 142.

When square-wave oscillator 159 develops an output voltage, it causes transistors 180, 182, 184, 186 and 188 to switch on and off. When the square-wave voltage that is applied to conductor 162 is high transistors 180, 182, 184, 186 and 188 are all biased conductive. When the voltage on conductor 162 goes low, these same transistors are biased nonconductive.

The gate electrodes of transistors 148 and 150 are connected to conductor 190. Conductor 190 is connected to the emitter of transistor 188 and to the emitter of transistor 192. The base of transistor 192 is connected to the collector of transistor 194 and the base of transistor 194 is connected to conductor 166.

When transistor 192 is conductive, transistors 148 and 150 are biased nonconductive. When transistor 188 is conductive, transistors 148 and 150 are biased conductive.

Assume now that the voltage across battery B2 is less than the voltage across battery B1. The output of comparator 164 will now be high which will tend to bias transistors 194 and 192 nonconductive. Transistor 188 is switched on and off by the square-wave voltage generator. When transistor 188 is off, transistors 148 and 150 are nonconductive. When transistor 188 conducts transistors 148 and 150 are biased conductive. When transistors 148 and 150 conduct, current is supplied to inductor L2 and when transistors 148 and 150 go nonconductive inductor L2 supplies current to battery B2 via diode 152. Accordingly, the battery B1 charges the battery B2.

The square-wave voltage generator may have an output frequency about 8000 Hz with a 50% duty cycle.

When the voltage across battery B1 is higher than the voltage across battery B2, the output of comparator 164 goes low so that the voltage on conductor 166 goes low. Transistors 192 and 194 are now biased conductive and accordingly transistors 148 and 150 are biased nonconductive. Accordingly, the converter is disabled and there is no energy transfer between the batteries.

The system of FIG. 2 has comparators 200 and 202, the outputs of which are connected to conductor 204 which, in turn, is connected to conductor 166. If the output of either comparator 200 or 202 goes low, transistors 148 and 150 are biased nonconductive.

The comparator 200 is part of a current limit circuit that shuts off transistors 148 and 150 if the current in conductor 158 exceeds a predetermined current limit value. The magnitude of the current in line 158 is sensed by a Hall effect sensor 204 that is arranged to respond to the magnetic field developed by the current in conductor 158. The Hall device 206 applies a voltage to the junction 208 via conductor 210. The magnitude of this voltage is a function of the magnitude of the current in the conductor 158. The voltage at junction 208 is applied to the negative terminal of comparator 200. The positive terminal of comparator 200 is connected to junction 211 of a voltage divider comprised of resistors 213 and 215. A resistor 212 and capacitor 214 are connected in parallel between junction 208 and conductor 142. Capacitor 214 may be a 0.10 microfarad capacitor and resistor 212 may have a resistance of 100K ohms. In summary, if the current in conductor 158 exceeds a current limit value, transistors 148 and 150 are biased off or nonconductive. When the current in conductor 158 drops below the current limit value, the transistors 148 and 150 are allowed to conduct, and they will be biased conductive providing that the voltage across battery B2 is less than the voltage across battery B1.

The temperature limit circuit of FIG. 2 will now be described. This circuit includes a negative temperature coefficient of resistance thermistor 216. The thermistor 216 senses the temperature of a heat sink (not illustrated) that is in thermal or heat transfer relationship with transistors 148 and 150. By the way of example, the thermistor 216 can be mounted on the heat sink.

The thermistor 216 is connected between conductor 146 and the negative terminal of comparator 202. The positive terminal of comparator 202 is connected to conductor 218 which in turn is connected to junction 220. The junction 220 is connected between voltage divider resistors 222 and 224.

When the temperature of transistors 148 and 150 exceed a temperature limit value, they are biased nonconductive.

The comparator 226, transistor 228 and signal lamp 230 form a load balance indicator. If the voltage across battery B2 is less than the voltage across battery B1, the signal lamp 230 is energized.

Comparators 202, 200, 164 and 226 may be a National Semiconductor type LM 139.

It will, of course, be appreciated that the current limit and temperature limit controls that have been described protect transistors Q1 and Q2 (FIG. 1) or transistors 148 and 150 (FIG. 2) from excessive current or temperature.

The embodiments of the invention in which an exclusive property or privilege is claimed are defined as follows:

1. A dual voltage electrical system comprising, a source of direct voltage comprising a generator having direct voltage output terminals, first and second batteries, means connecting said batteries in series across said direct voltage output terminals whereby said batteries can be charged in series from said generator, control means connecting said batteries operative in one mode of operation to charge said first battery from said second battery and operative in a second mode of operation to charge said second battery from said first battery, said control means comprising switching means connected between a respective battery and a battery current supply circuit means, said switching means when conductive connecting one battery to said circuit means, said circuit means operative to supply current to another battery when a switching means is operated nonconductive, and means responsive to the relative terminal voltages of said batteries for selecting one of said first and second modes of operation, said last-named means operative to select a mode of operation wherein the battery having the lower terminal voltage is charged from the other battery.

2. A dual voltage electrical system comprising, a source of battery charging voltage having direct voltage output terminals, first and second batteries connected in series across said direct voltage output terminals, the negative terminal of said first battery and the positive terminal of said second battery being connected together at a first junction, a second junction, an inductor connected between said junctions, a first semiconductor switch connected between the positive terminal of said first battery and said second junction, a first diode connected across said first semiconductor switch, a second semiconductor switch connected between the negative terminal of said second battery and said second junction, a second diode connected across said second semiconductor switch, said inductor being energized by one of said batteries when one of said semiconductor switches is biased conductive, said inductor supplying charging current to a battery through one of said diodes when a semiconductor switch is biased nonconductive, and control means responsive to the voltages across the batteries for causing said first semiconductor switch to switch on and off when the voltage across the second battery is lower than the voltage across the first battery and for causing said second semiconductor switch to switch on and off when the voltage across said first battery is lower than the voltage across the second battery.

3. The electrical system according to claim 2 wherein the means for causing the semiconductor switches to switch on and off comprises a square-wave voltage generator having a constant output frequency.

4. The electrical system according to claim 2 wherein a current sensing means senses the magnitude of current through said inductor and wherein means are provided to bias said semiconductor switches nonconductive when the current through the inductor exceeds a predetermined current limit value.

5. The electrical system according to claim 2 wherein a temperature sensing means senses the temperature of said semiconductor switches and wherein means are provided to bias said semiconductor switches nonconductive when the temperature of a semiconductor switch exceeds a predetermined temperature limit value.

6. A dual voltage electrical system comprising, a direct voltage generator having direct voltage output terminals, first and second batteries series connected across said output terminals, the negative terminal of said first battery and the positive terminal of said second battery being connected together at a first junction, a second junction, an inductor connected between said first and second junctions, a semiconductor switch connected between the positive terminal of said first battery and said second junction, a diode connected between said second junction and the negative terminal of said second battery, said semiconductor switch when conductive causing said first battery to supply current to said inductor, said inductor supplying current to said second battery through said diode when said semiconductor switch is nonconductive, control means responsive to the voltage across said batteries for maintaining said semiconductor switch nonconductive when the voltage across said first battery is lower than the voltage across said second battery and operative to cause said semiconductor switch to be switched conductive and nonconductive when the voltage across said second battery is less than the voltage across said first battery, current sensing means for sensing current flow through said inductor, and means for biasing said semiconductor switch nonconductive when the current through said inductor exceeds a predetermined current limit value.

7. The electrical system according to claim 6 where a temperature sensing means senses the temperature of said semiconductor switch and wherein means are provided for biasing said semiconductor switch nonconductive when the temperature of said semiconductor switch exceeds a predetermined temperature limit value.

* * * * *